United States Patent [19]

Moses

[11] 4,004,701
[45] Jan. 25, 1977

[54] HANDLING AND DISPENSING SYSTEM AND APPARATUS FOR CYLINDRICAL OBJECTS

[75] Inventor: Daniel H. Moses, Fairfield, Ohio

[73] Assignee: Champion International Corporation, Stamford, Conn.

[22] Filed: Dec. 24, 1975

[21] Appl. No.: 644,042

Related U.S. Application Data

[62] Division of Ser. No. 367,799, June 7, 1973, Pat. No. 3,951,276.

[52] U.S. Cl. .................. 214/16.4 A; 214/1 PB; 214/DIG. 4; 221/295; 214/8.5 K
[51] Int. Cl.² ................ B65G 1/06; B65G 59/00
[58] Field of Search ............... 214/16.4 R, 16.4 A, 214/16.4 B, 16 B, 620, 16.4 C, 1 PB, DIG. 4; 221/295–301

[56] References Cited

UNITED STATES PATENTS

| 265,400 | 10/1882 | Fitch | 221/301 |
|---|---|---|---|
| 309,103 | 12/1884 | Schofield | 221/301 |
| 1,388,065 | 8/1921 | Schmitz | 221/301 X |
| 2,699,878 | 1/1955 | Avery | 214/620 X |
| 3,232,449 | 2/1966 | Shen | 214/1 PB |
| 3,581,923 | 6/1971 | Archer | 214/620 |
| 3,674,159 | 7/1972 | Lemelson | 214/16.4 A |

FOREIGN PATENTS OR APPLICATIONS

| 151,963 | 11/1962 | U.S.S.R. | 1 PB/ |

*Primary Examiner*—Robert J. Spar
*Assistant Examiner*—R. B. Johnson

[57] ABSTRACT

A dispensing system apparatus for storing and dispensing cylindrical objects such as rolls of floor covering has a sloped rack on which the rolls are supported and further contains serially arranged dispensing and retaining blades for dispensing a roll near the leading edge of the rack on to a portable pallet carried by a conventional lift truck while retaining the roll behind it and then, by manipulation of the dispensing and retaining means, move the next cylindrical object into a position for dispensing while retaining in the storage facility a plurality of serially arranged cylindrical objects.

4 Claims, 8 Drawing Figures

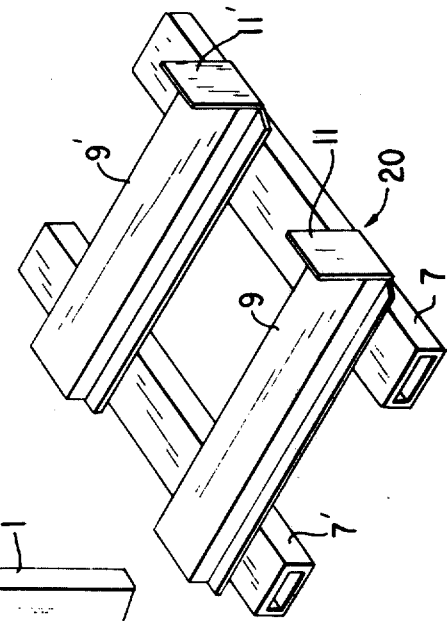
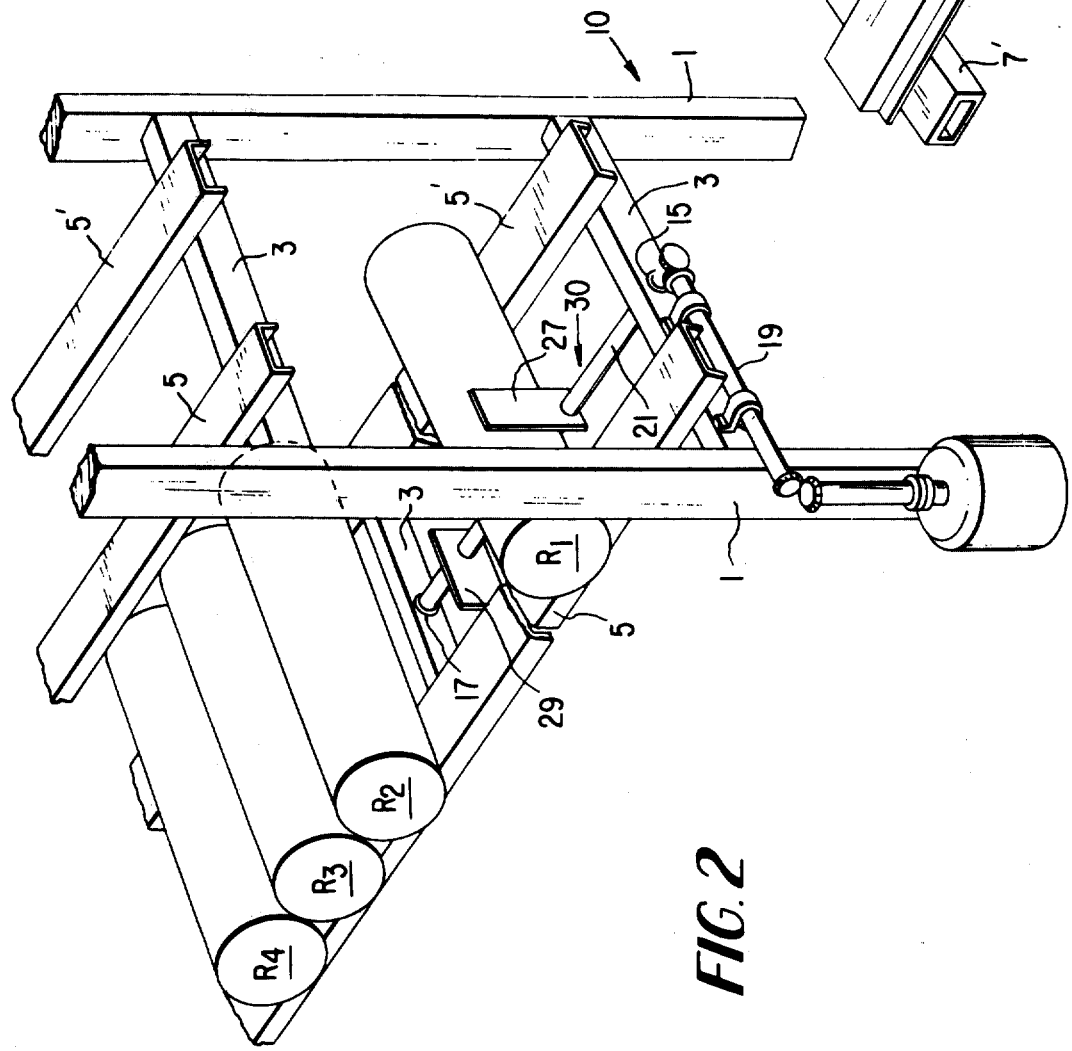

HANDLING AND DISPENSING SYSTEM AND APPARATUS FOR CYLINDRICAL OBJECTS

CROSS-REFERENCE TO RELATED APPLICATION

This is a division, of application Ser. No. 367,799 filed June 7, 1973, now U.S. Pat. No. 3,951,276 issued on April 20, 1976.

SUMMARY OF THE INVENTION

This invention relates to an improved handling system and dispensing having particular utility in the handling and storage of bulky and heavy cylindrical objects such as floor covering rolls and the like. One aspect of the invention relates to an improved dispensing apparatus combined with storage means. Another aspect of the invention relates to improvements and means for storing and dispensing cylindrical objects one at a time. Another aspect of the invention deals with a system including handling means for receiving the dispensed object. Further, the dispensing and handling system provides for storage of bulky and/or heavy cylindrical objects in a minimum of space. Without prejudice to broader coverage the invention will be described in connection with a floor covering roll storage and dispensing apparatus and handling system.

The present system contemplates storage of a number of cylindrical objects such as rolls of floor covering one behind another with axes parallel on a support means with a sloped bottom, such as sloping guide rails to provide gravity type of feed of the objects from the storage means.

There is provided in combination with such a storage means a pair of serially arranged detent members; the forward member being adjacent the leading or downhill edge of the sloping support with the rearward member being spaced at least one roll width away from the forward member in the direction of the storage means. The detent members can be moved into and out of engagement with roll material whereupon the roll will be retained or released at the point of discharge, respectively, to a portable pallet means for transporting it away from the storage means. Concurrently with this retention or release function of the forward member means, the second member or members retain a single roll or the balance of the cylindrical objects within the storage means when the forward means is releasing one and vice versa. In this manner, one roll at a time is released by the forward member while all the remaining rolls are detained by the rearmost member or members.

The system includes a simple dispensing device including at least a pair of blades mounted approximately one roll diameter apart along a shaft and projecting radially or diametrally from the shaft an angle of 90° relative to each other. In this manner, rotating the shaft 90° positions one of the blades so that a roll can and does pass over it and positions the other blade so as to retain a roll uphill of it. The portable pallet means includes a skeletal frame having means for alignment with the bottom edge of the storage means and stop means to receive and retain a dispensed cylindrical object. Additionally, this means is designed to receive the prongs of a conventional fork lift truck to render the pallet portable and mobile.

BACKGROUND OF INVENTION

In a typical roll storage facility whether for receipt of the manufactured product or for distribution of the roll product at wholesale or retail levels, it is customary to store the rolls in piles on some support means where the axes of the rolls are parallel and transverse to the access aisles providing space for entry and removal of the rolls from the storage means. Where the product is comprised of very wide and bulky rolls of large diameter, such as carpet, or wide rolls of considerable weight such as linoleum or equivalent floor coverings, it is impossible to handle the rolls without the assistance of some mechanical means. Since the axes and hence, the hollow core of the rolls are transverse to the handling space an obvious device is the fork lift truck since the prongs of the conventional fork lift can readily be inserted into the cores and the rolls lifted, lowered and transported from place to place with relative ease. Because the fork enters the roll core axially it is apparent that access to the roll storage means must be of such expanse as to provide for maneuvering of the lift truck for axial entry of the fork into the roll cores and also to permit maneuvering of the truck with the axial width of the roll extending parallel to the truck axis. Conventionally, a working space of approximately 16 feet in width, i.e. extending outwardly from the working side of the storage means, is required to enable a fork lift truck to maneuver in the process of handling the roll material.

When it is considered that manufacturing and sale of floor covering and similar roll form material is virtually a continuous operation, it is apparent that immense storage facilities must be provided to handle inventories of manufactured but unsold materials. When the space requirements for storage of the material are increased by the necessity of large areas of handling space such as 16 foot aisles, it can readily be seen that any storage and handling system and means that facilitates reduction in any area, storage or handling, represents a substantial advantage in the art.

The present invention then deals with the very vital problem of reducing costs and size of storage area by as much as 50% of the handling area required and in effecting this result without the expenditure of considerable sums of money for highly sophisticated and specialized handling equipment and storage facilities. In addition the invention, to be described in detail, is readily adaptable to existing handling and storage facilities.

Other objects, advantages and features of the inventive concept will become apparent from the following disclosure when read in conjunction with the drawings wherein:

FIG. 2 is an isometric schematic illustration of a rack for storing and dispensing rolls of carpeting to a pallet or similar attachment on the forks of a lift truck;

FIG. 3 is an isometric view of the roll receiving and transporting pallet used in conjunction with the storage rack of FIG. 2;

3

Figure 1A:
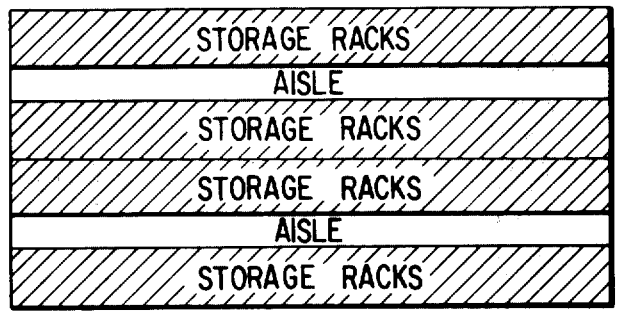
FIGS. 1a and 1b are illustrations of a typical prior art storage facility in a 100 × 200 foot building as compared with the storage facility utilizing the present invention.
Figure 1B:
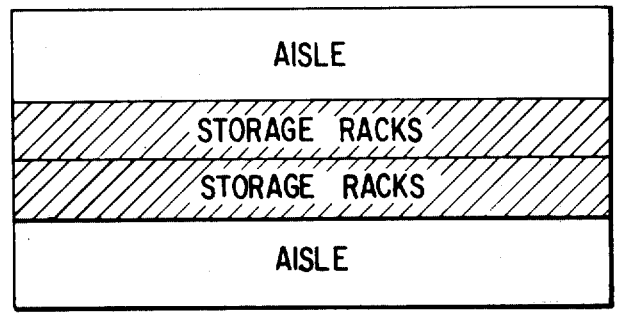
Figure 4:
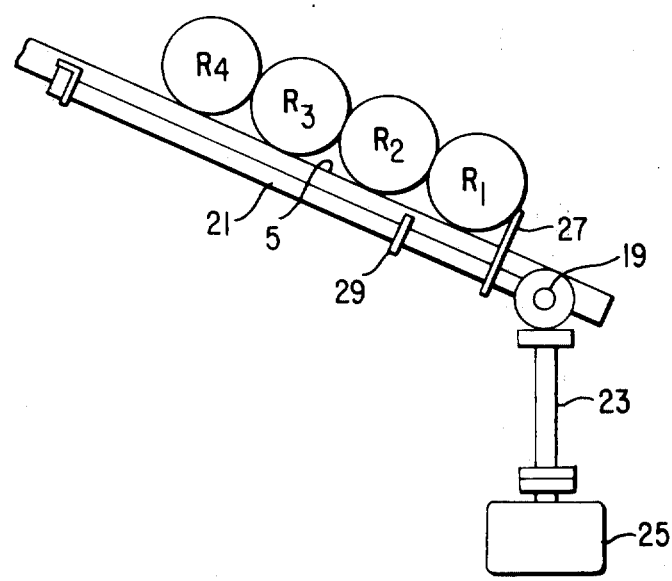
FIG. 4 is a side schematic view of a part of the apparatus of FIG. 1 showing the blades in position when the front roll is retained.
Figure 5:
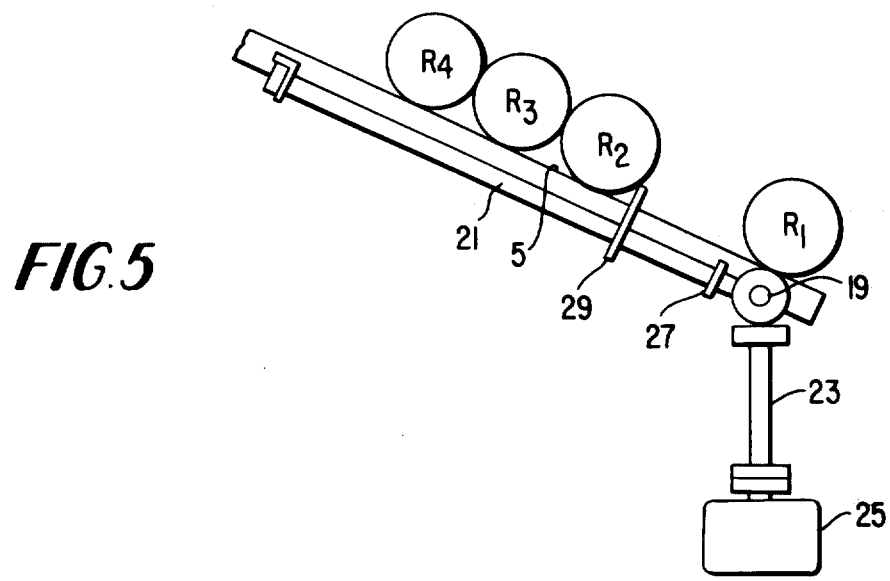
Figure 6:
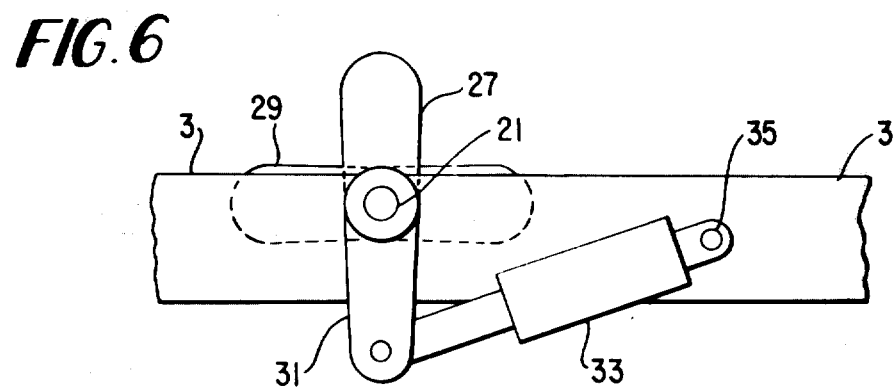
Figure 7:
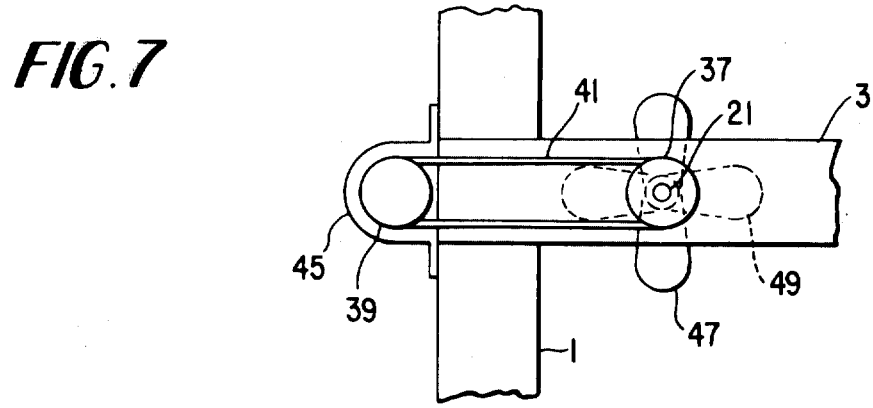

FIG. 5 is a side schematic view similar to FIG. 4 but showing the position of the blades when the front roll is being dispensed and the roll immediately behind it retained;

FIG. 6 illustrates schematically an alternative drive means for the shaft 21, while FIG. 7 schematically illustrates a further modified form of dispensing and retaining mechanism.

DETAILED DESCRIPTION

In FIG. 2 there is illustrated a storage facility for rolls of floor covering comprising a storage rack 10. Rack 10 includes vertical structural columns 1, cross members 3 and roll support rails 5 and 5'. The rails 5 and 5' are disposed at a slight angle approximately 5° to the horizontal toward the front or working face of the rack. In the present system it is desired to dispense the rolls by gravity, one at a time, from the storage rack 10 to a handling pallet 20 which is mounted on the forks of a conventional lift truck or the like.

The portable pallet 20 is comprised of a pair of conventional box beam members 7 and 7' fixed in spaced apart parallel relation by a pair of inverted channel members 9, 9' the latter being similar and spaced apart in the same parallel relation as are the rails 5,5' of storage rack 10. The right-hand ends of the channel members, as viewed in FIG. 3, are provided with upstanding roll stop means 11, 11'. The most conventional means of assembly of the skeletal pallet is by welding at the various connection points. One particular relationship that is of importance is the spacing not only between inverted channel members 9, 9' noted above, but the spacing between box members 7, 7'. This spacing is such as to correspond to the distance between the prongs of a conventional fork-lift truck so that the prongs may enter the hollow interiors of members 7 and 7' for lifting and maneuvering the pallet 20.

As shown in FIG. 2, the racks additionally comprise several spaced vertical tiers of product supporting rails. The limitation on the number of tiers and/or height of the racks is that imposed solely by the limitations on lifting ability and reach of the lift trucks used in handling pallet 20.

As is further shown in FIG. 2, the cross members 3 in each tier carry the rolled product separating and dispensing means 30 which is shown only as applied to one tier for illustrative purposes.

A shaft 21 is provided between the fore and aft cross member 3. This shaft is advantageously mounted in bearings 15, 17 which are in turn secured (as by a conventional pillow block construction) to the cross members 3, 13. At the forward end of the shaft adjacent the leading or working face of the rack 10 (illustrated as forward cross bar 3) is a further gear and shaft assembly 19 which meshes with a gear, not identified, keyed on shaft 21 to provide a means to rotate the shaft 21. The shaft 19 is in turn coupled to a reversible electric motor by a further shaft and gear assembly 23. Adjacent the same forward edge of rack 10 is the first or forward dispensing or retaining blade 27 which is arranged to project radially from the shaft 21 in a plane approximately perpendicular to the rail members 5, 5'. Incidentally, the shaft is positioned to lie in either the same plane or preferably in a plane slightly beneath and parallel to the upper surfaces of rails 5, 5' so that the rolls may freely roll down rails 5, 5'.

Spaced rearwardly from the dispensing blade 27 is a second retaining blade 29 which projects from the shaft 21 radially and is rotated to an angular position of 90° from the position of the forward blade 27. Thus when blade 27 is projecting upwardly above the surfaces of rails 5, 5' the blade 29 is disposed below the surfaces and vice versa.

As shown in FIG. 4, the forward blade 27 acts as a stop for the foremost roll R, so long as the blade is in its uppermost position. When, however, the shaft 21 is rotated through an angle of 90°, the blade lies below the surface of rails 5, 5' and roll R, and is released to progress by gravity onto the pallet 20.

Referring still to FIGS. 2 and 4, at the same time that the dispensing blade 27 is rotated 90° to dispense the forwardmost roll R, the retaining blade 29 is turned to an upright position where it engages the second roll $R_2$, and prevents same from rolling or otherwise advancing along the rails 5, 5' towards the working face of the rack 10. This retaining function of blade 29 continues until such time as the shaft 21 is again turned 90° whereupon the roll $R_2$ moves over the downturned blade 29 and advances by gravity toward the working edge, to where it replaces roll $R_1$, and is held in ready position by the forward or dispensing blade 27 thus returning the system to its original condition.

In the described structure utilizing blades of the type shown positioned at 90° apart the drive may be by the disclosed electric motor 25 driving shaft assembly 23. It is also possible to utilize a hydraulic operator in the form of a reciprocating motor as shown in FIG. 6. In this arrangement, shaft 21 is connected to a crank 31 which in turn is connected in a conventional manner to the double acting reciprocating motor 33 having one end 35 anchored to cross member 3. The power source and operating controls for motor 33 are purely conventional and need not be described in detail. Thus, as motor 33 is operated the reciprocating motion is transmitted through crank 31 to shaft 21 to rock the shaft back and forth between the two 90° positions.

FIG. 7 shows modified blades extending diametrically from the shaft. When using the radial blades of FIG. 2 et seq., the shaft 21 is rocked back and forth between two positions angularly spaced 90° apart.

However, in the FIG. 7 disclosure, since each blade 47 and 49 projects 180° in both directions from the shaft the shaft may be rotated in one direction only, stopping at 90° intervals to produce the same results as the FIG. 2 et seq. structure without the necessity of reversing the direction of movement of shaft 21. Thus, the diametral blade arrangement of FIG. 7 lends itself to operation by unidirectional electric motor and much more simplified controls. In this case also a simple chain and sprocket drive comprising sprockets 37 and 39 and chain 41 may be driven by motor 45.

It should be noted that in both the FIG. 2 et seq. and FIG. 7 versions of the dispensing and retaining device, the axial spacing of blades 27 and 29, or 47, 49, as the case may be, along the shaft 21 is approximately equal to the anticipated diameter of the rolled product $R_1$, $R_2$, $R_3$ etc., so that as the blade 29 or 49 moves to the up or operative position it will move into the space at the bottom between the rolls $R_1$, $R_2$, etc., and separate the adjacent rolls without damage to the products. In most instances, this distance can be standardized because the particular industry such as carpeting or floor covering industry standardizes on roll size. Where, however, the system is to be used in handling and storing rolls which may vary in size, i.e. diameter, the blades 27 and 29 and 47 and 49, as the case may be, may be adjustably attached to the shaft.

Having described the invention in detail, it will be apparent that various modifications will occur to those skilled in the art, hence the invention is limited only as defined in the appended claims, wherein:

What is claimed is:

1. A space saving system for storing and handling cylindrical stock such as floor coverings and the like comprising a plurality of identical racks in rows so arranged as to define corridors between every two adjacent rows to admit an object carrying movable pallet to move between said rows along said corridor, said racks having a support structure sloping toward the working face of said rack facing said corridors for receiving and storing a plurality of pieces of cylindrical stock in serial order with the axes of the pieces parallel to each other and also to a plane passing through the working face of the rack, a first and second rotary retention means in the form of single thin blades radially extending from and fixed to a common rockable shaft and having their wide faces traversed to said cylindrical stock on said rack engaging and holding said lowermost cylinder in said rack, said second retention means being displaced angularly at 90° to said first means and positioned inwardly in the face of the rack a distance at least equal to the diameter of one cylindrical article engageable with the next succeeding piece of cylindrical stock of said cylindrically pieces thereof, a common drive means interconnecting said retention means to position said first retention means in an inoperative position to free said lowermost cylinder for discharge from said rack and simultaneously to position said retention means in operative position to hold the next succeeding piece of cylindrical stock in position in said rack and vice versa, said drive means mounted on said racks and positioned out of the path of movement of said pieces of cylindrical stock from the rack and also the path of movement of a pallet along said corridors; and a portable pallet means including a skeletal frame having means to receive the prongs of a fork lift truck moveable along said corridors between facing racks and of a width to receive a single piece of said cylindrical stock positioned adjacent the working face of the storage rack for receiving the lowermost piece of cylindrical stock by gravity discharge from said rack upon operation of said retention means to free same, said pallet means including stop means positioned in a plane parallel to the longer axis of said pallet means for holding said first piece of cylindrical stock on said pallet means for subsequent transport in a direction parallel to its axis when it is discharged onto said pallet means.

2. A storage system for cylindrial stock as defined in claim 1 wherein said racks include a plurality of vertically-aligned tiers each tier having a sloping bottom to receive said cylinders to stock.

3. A system for storing cylindrical stock as defined in claim 1 wherein the bottom slopes at an angle of not less than 5° from the horizontal toward the working face of the rack.

4. A system for storing cylindrical stock as defined in claim 1 wherein said drive means includes a reversible motor.

* * * * *